2,922,719

STRUCTURAL CLAY PRODUCTS AND METHOD OF MAKING THE SAME

Gilbert C. Robinson, Clemson, S.C., assignor to Zonolite Company, Evanston, Ill., a corporation of Montana No Drawing. Application April 8, 1957
Serial No. 651,162

5 Claims. (Cl. 106—40)

The present invention is concerned with structural clay products and with improved methods for producing such products.

Some attempts have been made in the past to provide shaped structural clay products by shaping an aqueous clay slip, as by molding, and then firing the clay materials after the water in the slip had been driven off. Such processes have not been uniformly successful for a number of reasons. For one, the clay products frequently exhibited internal stresses due to the molding which detracted from the their ultimate strength properties. For another, the clay products in giving up the water prior to firing exhibited a considerable amount of shrinkage usually on the order of five percent during setting and about six percent during firing so that the products which resulted were not as dimensionally accurate as desired.

Accordingly, an object of the present invention is to provide an improved process for making structural clay products having enhanced strength properties.

A further object of the invention is to provide a process for shaping structural clay products in which the amount of internal stress created in the molding operation is held to a minimum.

A still further object of the invention is to provide a process for the manufacture of structural clay products which reduces very substantially the normal shrinkage incident to the molding of clay slips.

Still another object of the invention is to provide improved structural clay products characterized by lightweight and excellent strength properties.

The present invention is applicable to all types of structural clay, meaning that any clay material that can be used in the making of a structural product can be employed in the process of the present invention. This class of materials includes a very wide variety. It ranges from the very pure clays such as kaolin or ball clays to volcanic rock fragments which actually have only a very small content of clay matter. The more pure materials are employed in the manufacture of better structural products such as vitreous floor tile or bathroom type wall tile. Somewhat less pure clays are used in the manufacture of structural glazed tile. The most impure materials are used in the manufacture of red firing structural tile, brick or sewer pipe. These materials may vary from alluvial clays to residual clays to shales, slates and phyllites, and even volcanic rocks.

Most of the materials employed in structural clay products are made up of a mixture of constituents. A certain proportion of the raw material is true clay. Another portion may include such non-clay materials as silica, mica, feldspar, iron minerals or the like.

Particle size of the non-clay materials varies considerably as these materials may be present in very finely divided form or in sizes up to about a quarter of an inch.

In the process of the present invention, the clay particles are dispersed in water to form an aqueous slip and this slip is combined, with mixing, with a water absorptive aggregate and the resulting mixture is then promptly shaped, as by means of casting into a mold.

The following specific examples of clay mixtures have been successfully employed in preparing the aqueous clay slip, the percentages being by weight:

*Example I*

50% horneblende
10% apatite
25% feldspar
15% mixed clay and vermiculite fines

*Example II*

10% "C & C" ball clay
4% "Bandy Black" ball clay
4% "Bell Dark" ball clay
4% "Ky #40" ball clay
4% "Weldon" ball clay
14% "WW" kaolin
5% "Peerless" kaolin
30% feldspar
25% potter's flint (pulverized silica)

*Example III*

26% ball clay
24% kaolin
30% feldspar
20% potter's flint

*Example IV*

40% feldspar
30% potter's flint
30% ball clay

Further improvements in reducing the amount of shrinkage can be achieved if a deflocculating agent such as sodium silicate or sodium carbonate in amounts of from 0.2% to 1.0% are included in the aqueous clay slip.

The amount of the aggregate and the amount of water present are controlled such that the water absorptive aggregate is able to absorb the free water of the slip in a relatively short time. As the aggregate absorbs the water, the flowable mass present originally changes into a self-sustaining structure conforming to the shape of the mold into which it was introduced. The "setting" of the mixture is accomplished without introducing significant amounts of stresses into the clay and without substantial amounts of shrinkage. In fact, the total shrinkage of a mass of the type described is usually less than 1%.

After the free water has been absorbed from the slip, and a self-sustaining mass has been produced, the mass is fired at a temperature appropriate to the particular clay constituents, and the flux employed, to vitrify the clay in the mass and produce a lightweight, strong structural product.

A large number of water-absorptive aggregates can be employed successfully in the process of the present invention. However, I prefer to employ an exfoliated vermiculite because of its excellent water absorption properties and its strength characteristics. However, other materials such as expanded perlite or expanded Haydite (a bloated or expanded shale or clay) can be used for the same purpose, but not necessarily with equivalent results.

The relative proportions of the materials in the mixture will vary considerably depending upon the density of the final product desired and the strength properties required in the product. Generally, however, the clay slip contains water in the amount from 25 to 100% by weight of the solids in the slip, the solids being divided usually between the clay particles and a flux such as feldspar. The amount of aggregate is normally on the order of 10 to 75% by volume of total mixture and, more preferably, is combined with the slip in equal volume.

For many applications, it is desirable to modify the water absorption properties of the aggregate in order to make it more suitable for the particular product involved. In general, with vermiculite, the water absorption capability of the exfoliated vermiculite varies inversely with the particle size of the vermiculite particles. There appears to be no minimum size limitation but it appears that for best results the size of vermiculite particles should not exceed that size which passes through a number four screen (U.S. Series).

The water absorption properties of the aggregate can also be controlled to some extent by a control of the process of exfoliation in the case of vermiculite or of thermal expansion in the case of perlite or Haydite. In the case of vermiculite, exfoliation at lower temperatures on the order of 1100° F. produces a very highly water-absorbent material while exfoliation at 1500° F. diminishes the rate of absorption of water by the particles. I prefer to use an exfoliation temperature of about 1500° F. because particles exfoliated at this temperature provide an adequate setting time for the mixture so that the consistency of the mix can be smoothed out, if necessary, before the free water is completely absorbed by the vermiculite particles. As a general rule, the setting time is preferably in the range from about five minutes to about ninety minutes.

Another manner for controlling the water-absorptivity of the particles is through the medium of a coating on the particles. For example, the natural water-absorptivity of exfoliated vermiculite particles can be controlled by applying a very thin layer of asphalt or the like on the particles or by coating them with polysiloxane resins, waxes, or the like.

In making the improved structural clay products of the present invention, the aqueous clay slip is made up, containing the desired amount of water, and the slip is combined with the amount of dry, exfoliated vermiculite which will be sufficient to dewater the slip in the desired period of time which is normally from 10 to 30 minutes. The vermiculite is added to the slip and mixed rapidly. After mixing, the consistency of the mix is still liquid enough to pour or shape into molds. Shaking of the mold during pouring aids in obtaining a uniform consistency. As the material is poured, it flows into the mold and into the corners of the mold so that the cast mixture conforms accurately to the outline of the mold. After a few minutes' time, the vermiculite absorbs enough of the water of the clay slip to cause a stiffening of the cast mixture so that the material may be withdrawn from the mold after it assumes a self-sustaining shape. In the process of setting up, there is no crushing of the vermiculite granules as every grain of vermiculite is apparently completely surrounded by a pure coating of the bonding ingredients. This type of setting up has an advantage in that it reduces the water permeability of the finished article and produces a lower bulk density for any given quantity of vermiculite than is possible to achieve with other processes.

After the material is removed from the mold, it is fired at a temperature appropriate for the particular clay ingredient involved. Ordinarily, this firing temperature will vary from about 1700 to about 2100° F.

The bulk density of the completed article varies substantially with the amount of vermiculite employed. For example, a cast object having a bulk density as low as 10 pounds per cubic foot can be produced by employing a mixture of 75% by volume of vermiculite to 25% by volume of a clay slip containing upwards of 50% water. A material having a density of 125 pounds per cubic foot can be produced by employing a mixture of 10% by volume of vermiculite with 90% by volume of a clay slip containing about 36% water.

The strength of the fired material will, of course, vary with the particular clays employed and with the amount of vermiculite present. A material having an intermediate bulk density of about 60 pounds per cubic foot produced according to this process has a transverse strength of about 1500 pounds per square inch.

From the foregoing, it will be apparent that the process of the present invention provides a greatly improved manner for incorporating aggregate compositions into a structural clay product. The shrinkage normally incidental to the manufacture of structural clay products has been greatly reduced and the internal stresses set up during the formation of the product and the firing of the product have been virtually eliminated. With the process of the present invention it is possible to produce an article of carefully controlled bulk density, and strength properties.

It will be evident that various modifications can be made to the described embodiments without departing from the scope of the present invention.

I claim as my invention:

1. A method of making a structural clay product, which comprises the steps of dispersing clay particles in water to form an aqueous slip, adding to the slip a dry water-absorptive aggregate in a sufficient quantity to dewater the slip in a period of time generally between about 10 and 30 minutes, rapidly mixing the aggregate into the slip immediately after adding said aggregate thereto and providing a mixture of pouring consistency wherein the aggregate is essentially uniformly dispersed throughout, rapidly transferring the mixture to a shaping mold and before the aggregate has removed substantial water from the slip, permitting the shaped mixture to stand for a time sufficient to permit said aggregate to absorb the free water from said slip and thereby form a self-sustaining mass, and thereafter firing said mass at a temperature sufficient to vitrify the clay in said mass.

2. A method of making a structural clay product as defined in claim 1, wherein the aggregate is a material selected from the group consisting essentially of exfoliated vermiculite, expanded Haydite, and expanded perlite.

3. A method of making a structural clay product, which comprises the steps of forming an aqueous clay slip comprising clay particles and water in an amount of from 25 to 100% by weight of solids in the slip, adding to the slip dry exfoliated vermiculite in an amount of from 10 to 75% by volume of the total mixture resulting from the addition, immediately and rapidly stirring the mixture after the addition of vermiculite to provide a uniform dispersion of the vermiculite throughout the mixture, quickly flowing the mixture into a shaping mold and before the vermiculite has removed substantial water from the slip, allowing the mixture to stand in the mold free of substantial pressure thereon until the vermiculite has absorbed essentially all free water in the mixture and a self-sustaining mass is formed, and removing the mass from the mold and firing the same at a temperature sufficient to vitrify the clay therein and of the order of 1700 to 2100° F.

4. A structural clay product essentially free of internal stresses therein and as produced by the method of claim 1.

5. A structural clay product essentially free of internal stresses therein and as produced by the method of claim 3.

References Cited in the file of this patent

UNITED STATES PATENTS

| | | |
|---|---|---|
| 2,079,665 | Seigle | May 11, 1937 |
| 2,103,463 | Jones | Dec. 28, 1937 |
| 2,377,491 | Goodrich | June 5, 1945 |